US012675321B2

(12) United States Patent
Hebbar

(10) Patent No.: US 12,675,321 B2
(45) Date of Patent: Jul. 7, 2026

(54) SUBSYSTEM-SPECIFIC NOTIFICATION FRAMEWORK FOR HANDLING ADJUSTMENTS TO BATCH REQUESTS

(71) Applicant: Truist Bank, Charlotte, NC (US)

(72) Inventor: Nagaraja Hebbar, Atlanta, GA (US)

(73) Assignee: Truist Bank, Charlotte, NC (US)

( * ) Notice: Subject to any disclaimer, the term of this patent is extended or adjusted under 35 U.S.C. 154(b) by 441 days.

(21) Appl. No.: 18/314,525

(22) Filed: May 9, 2023

(65) Prior Publication Data

US 2024/0378080 A1 Nov. 14, 2024

(51) Int. Cl.
*G06F 9/48* (2006.01)
*G06F 9/54* (2006.01)

(52) U.S. Cl.
CPC ............ *G06F 9/4881* (2013.01); *G06F 9/546* (2013.01)

(58) Field of Classification Search
None
See application file for complete search history.

(56) References Cited

U.S. PATENT DOCUMENTS 7,360,202 B1 * 4/2008 Seshadri ............. H04L 12/1859
717/106
8,856,807 B1 * 10/2014 Khapre ................. G06Q 30/06
714/48

9,245,036 B2 * 1/2016 Poornachandran ... H04L 51/224
11,055,754 B1 * 7/2021 Khapre .................. G06Q 10/10
2009/0172674 A1 * 7/2009 Bobak ................. G06F 11/1482
718/101
2009/0210268 A1 * 8/2009 Fan ..................... G06Q 30/0603
705/26.1
2019/0102107 A1 * 4/2019 Guim Bernat ........ G06F 3/0659
2022/0276901 A1 * 9/2022 Ravala .................... G06F 11/00

FOREIGN PATENT DOCUMENTS

WO WO-2008005447 A2 * 1/2008 ............. G06Q 50/04

* cited by examiner

*Primary Examiner* — Charles E Anya
(74) *Attorney, Agent, or Firm* — Kilpatrick Townsend & Stockton LLP; Michael A. Springs, Esq.

(57) ABSTRACT

A computing environment can provide subsystem-specific notifications of adjustments to a batch of requests. For example, a system can receive an alert indicating an occurrence of an event involving an adjustment to a submitted batch of requests. The system can identify a set of subsystems from a group of subsystems to notify of the occurrence of the event. Each subsystem in the set of subsystems can be configured to receive notifications from a corresponding message queue of a group of message queues. The system can, for each message queue of the group of message queues, customize a subsystem-specific notification of the occurrence of the event. The subsystem-specific notification can be formatted according to a formatting criterion for a corresponding subsystem. For each message queue of the group of message queues, the system can publish the subsystem-specific notification to the message queue for transmission to the corresponding subsystem.

20 Claims, 3 Drawing Sheets

100

300

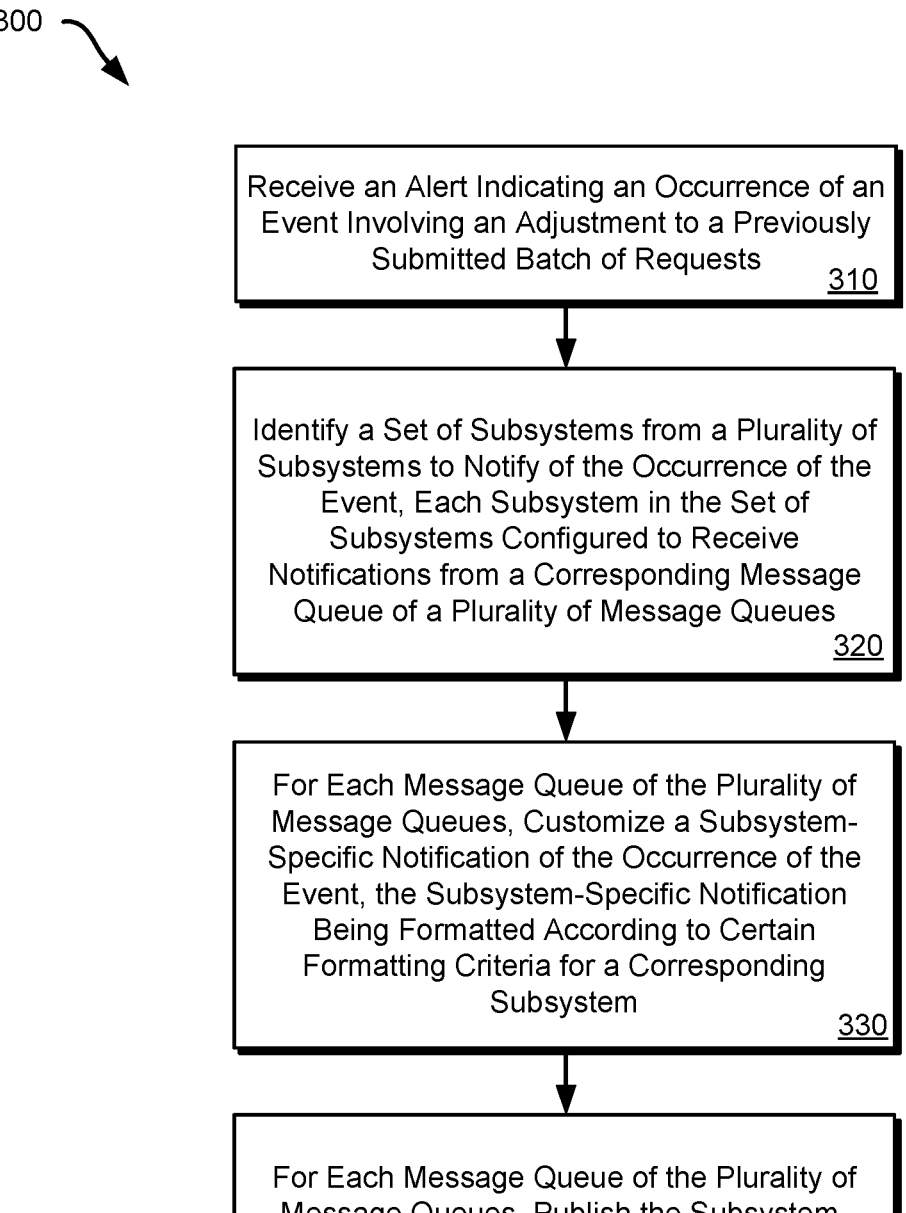

Receive an Alert Indicating an Occurrence of an Event Involving an Adjustment to a Previously Submitted Batch of Requests
<u>310</u>

Identify a Set of Subsystems from a Plurality of Subsystems to Notify of the Occurrence of the Event, Each Subsystem in the Set of Subsystems Configured to Receive Notifications from a Corresponding Message Queue of a Plurality of Message Queues
<u>320</u>

For Each Message Queue of the Plurality of Message Queues, Customize a Subsystem-Specific Notification of the Occurrence of the Event, the Subsystem-Specific Notification Being Formatted According to Certain Formatting Criteria for a Corresponding Subsystem
<u>330</u>

For Each Message Queue of the Plurality of Message Queues, Publish the Subsystem-Specific Notification to the Message Queue for Transmission to the Corresponding Subsystem
<u>340</u>

FIG. 3

SUBSYSTEM-SPECIFIC NOTIFICATION FRAMEWORK FOR HANDLING ADJUSTMENTS TO BATCH REQUESTS

TECHNICAL FIELD

The present disclosure relates generally to notification frameworks for computing environments and, more particularly (although not necessarily exclusively), to a subsystem-specific notification framework for handling adjustments to previously submitted batch requests.

BACKGROUND

A computing system can periodically transmit service requests as batches of requests. A user can receive alerts or updates about statuses of the requests in a batch. The alerts can indicate an occurrence of an event associated with a previously submitted batch of requests. Examples of such events can include a change associated with requests in the previously submitted batch or a return of a request in the previously submitted batch.

SUMMARY

A batch-adjustment notification framework can provide subsystem-specific notifications of an occurrence of an event involving an adjustment to a previously submitted batch of requests. For example, a method described herein can include receiving, by one or more processors, an alert indicating an occurrence of an event involving an adjustment to a previously submitted batch of requests. The method can also include identifying, by the one or more processors, a set of subsystems from a group of subsystems to notify of the occurrence of the event. Each subsystem in the group of subsystems can receive notifications from a corresponding message queue of a group of message queues. For each message queue of the group of message queues, the method can include customizing, by the one or more processors, a subsystem-specific notification of the occurrence of the event. The subsystem-specific notification can be formatted according to formatting criteria for a corresponding subsystem. For each message queue in the group of message queues, the method can include publishing, by the one or more processors, the subsystem-specific notification to the message queue for transmission to the corresponding subsystem.

In another example, a system described herein includes one or more processing devices and a memory. The memory includes instructions executable by the one or more processing devices to perform operations. The operations can include receiving an alert indicating an occurrence of an event involving an adjustment to a previously submitted batch of requests. The operations can also include identifying a set of subsystems from a group of subsystems to notify of the occurrence of the event. Each subsystem in the group of subsystems can receive notifications from a corresponding message queue of a group of message queues. For each message queue of the group of message queues, the operations can include customizing a subsystem-specific notification of the occurrence of the event. The subsystem-specific notification can be formatted according to formatting criteria for a corresponding subsystem. For each message queue in the group of message queues, the operations can include publishing the subsystem-specific notification to the message queue for transmission to the corresponding subsystem.

In another example described herein a non-transitory computer-readable medium can include instructions executable by one or more processing devices to perform operations. The operations can include receiving an alert indicating an occurrence of an event involving an adjustment to a previously submitted batch of requests. The operations can also include identifying a set of subsystems from a group of subsystems to notify of the occurrence of the event. Each subsystem in the group of subsystems can receive notifications from a corresponding message queue of a group of message queues. For each message queue of the group of message queues, the operations can include customizing a subsystem-specific notification of the occurrence of the event. The subsystem-specific notification can be formatted according to formatting criteria for a corresponding subsystem. For each message queue in the group of message queues, the operations can include publishing the subsystem-specific notification to the message queue for transmission to the corresponding subsystem.

BRIEF DESCRIPTION OF THE DRAWINGS

FIG. 3 is a flow chart of an example of a process for publishing sub-system-specific notification of batch adjustments according to some aspects of the present disclosure.

DETAILED DESCRIPTION

Figure 1:
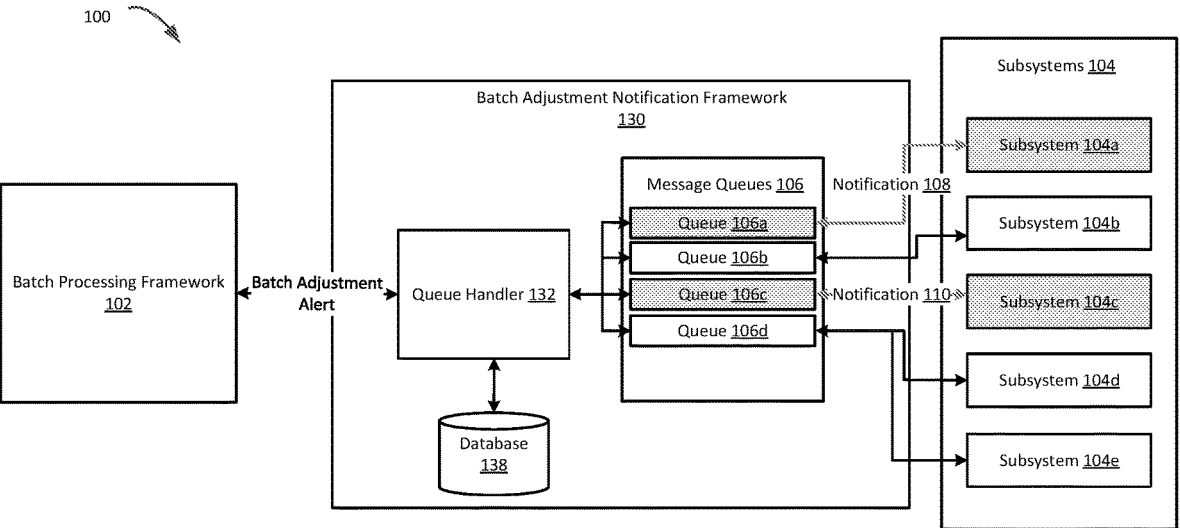
FIG. 1 is a block diagram of an example of a subsystem-specific notification environment for handling adjustments to submitted batched requests according to some aspects of the present disclosure.

Certain aspects and examples of the present disclosure relate to a batch-adjustment notification framework that can provide subsystem-specific notifications of an occurrence of an event involving an adjustment to a previously submitted batch of requests. The adjustment can include a return, a change, or a cancellation with respect to one or more requests in the batch. For each event, the batch-adjustment notification framework can identify computer subsystems to notify of the occurrence of the event. The batch-adjustment notification framework can notify each subsystem via message queues. For each message queue, the batch-adjustment notification framework can customize a subsystem-specific notification indicating the occurrence of the event. The subsystem-specific notification can be formatted according to formatting criteria associated with a corresponding subsystem. The batch-adjustment notification framework can publish, to each of the message queues, the corresponding subsystem-specific notification for transmission to the corresponding subsystem.

In response to receiving the subsystem-specific notification, the corresponding subsystem can automatically perform tasks associated with the adjustment. Tasks can include updating databases, providing notifications, or adjusting and resubmitting requests as part of a new batch. In some examples, at least one of the subsystems to be notified can be part of a remote network, which is external to a computing network that contains the batch-adjustment notification framework. For instance, the subsystem associated with the remote network can be a third-party subsystem that is operated by a different entity than the batch-adjustment notification framework.

As an example, a computing system associated with the batch-adjustment notification framework can transmit a batch of 100,000 requests to a batch processing framework. Each of the requests can be a service request associated with a user account maintained by an entity operating the computing system. In some examples, the service request can involve a digital transfer of an amount of value between the user account and a third-party account. When the service request is processed by the batch processing framework, the digital transfer of the amount can occur and the service request can be considered complete. The digital transfer can be a recurring transfer, meaning that the digital transfer is repeated periodically (e.g., daily, monthly, or yearly). A grace period can elapse between a time that a request is received by the batch processing framework and a time when an alert about an adjustment to the request is received by the batch-adjustment notification framework. For example, the grace period can be a thirty-day period. After the thirty-day period, alerts associated with the submitted batch may no longer be received by the batch-adjustment notification framework.

By an end of the grace period, most of the requests can be considered complete. Some of the requests can involve an adjustment performed by the batch processing framework, such as a return or a change. In some examples, the adjustment can delay or hinder a request from being completed. The batch processing framework can relay information regarding the adjustments to the batch-adjustment notification framework. A first subset of the requests may have corresponding adjustments. For example, the 500 of the original 100,000 requests may have corresponding adjustments, such as returns or changes to their original data. When there is an adjustment to a request, in some cases the request may still be completed. In other cases, the request may be paused (e.g., until the adjustment is approved) or rejected. Either way, tasks can be performed by subsystems to account for the adjustment to the request. The tasks performed by the subsystems may help ensure that the current request is completed and/or that future similar requests can be completed without delays. Examples of such tasks can include updating databases, providing notifications, or adjusting an attribute of a future request in a sequence of recurring requests.

Multiple subsystems can perform the tasks. For instance, in the above example involving 500 requests with corresponding adjustments, the batch-adjustment notification framework can identify specific subsystems to perform tasks related to each of the adjustments. For example, one identified subsystem may perform updates to recurring digital transfers associated with one of the adjustments. Another identified subsystem may update a database based on an adjustment. Multiple and different subsystems can be identified to perform tasks in response to each adjustment.

For a particular adjustment, the batch-adjustment notification framework can notify each identified specific subsystem of the adjustment. Each notification can be a subsystem-specific notification sent via a message queue subscribed to by a corresponding subsystem. The subsystem-specific notification can be formatted according to formatting criteria associated with the corresponding subsystem. For example, the subsystem-specific notification may enrich data by adding additional data to the subsystem-specific notification that is not included in other subsystem-specific notifications. For instance, the batch-adjustment notification framework can extract and add phone number data or Internet Protocol (IP) address data to the subsystem-specific notification to allow the corresponding subsystem to perform an authentication check before updating a database based on the notice of change.

There can be many kinds of adjustments, particularly with respect to the underlying data of an original request. Examples of such data adjustments can include a change in the amount to transfer between the user account and the third-party account changes, a change in the characteristics of either the user account or the third-party account (e.g., account numbers change, etc.), a change in the due date occurs for a recurring transfer between the user account and the third-party account, or some combination thereof.

As noted earlier, adjustments can also include returns of requests, which may also be referred to as just "returns" for simplicity herein. For example, 1000 returns can occur with respect to the original batch of 100,000 requests. A return can occur when a request is rejected by the recipient for some reason and returned to the sender for adjustment to overcome the reason for rejection. For example, a return can occur because either the third-party account or the user account is no longer active, there is insufficient value in either the user account or the third-party account to complete the digital transfer associated with the request, an authentication step associated with the digital transfer fails, etc. The batch processing framework can relay information regarding the 1000 returns to the batch-adjustment notification framework.

When a return occurs, a request associated with the return cannot be completed. The returned request may need to be altered to resolve the problem and re-transmitted. But, tasks can still be performed by subsystems to address the return. Multiple subsystems can perform the tasks. Tasks associated with returns can include updating databases, providing notifications, or adjusting and resubmitting the request as part of a future batch of requests. In the above example involving the 1000 returns, for each of the 1000 returns, the batch-adjustment notification framework can identify specific subsystems to perform tasks related to the returned request. For example, one identified subsystem may perform an automatic transfer between a secondary user account and the user account and can resubmit the request as part of a new batch of requests. Another identified subsystem can notify the user of the return. Multiple and different subsystems can be identified to perform tasks for each return.

For a particular return, the batch-adjustment notification framework can notify each identified specific subsystem of the return. Each notification can be a subsystem-specific notification sent via a message queue subscribed to by a corresponding subsystem. The subsystem-specific notification can be formatted according to formatting criteria associated with the corresponding subsystem. The formatting criteria associated with each corresponding subsystem can be stored in a database of the batch-adjustment notification framework, which can access the database to determine how to properly format each subsystem-specific notification. For example, the subsystem-specific notification may enrich data by adding additional data to the subsystem-specific notification that is not included in the return. For instance, the batch-adjustment notification framework can extract and add phone number data or Internet Protocol (IP) address data to the subsystem-specific notification to allow the corresponding subsystem to perform an authentication check before updating a database based on the return.

In a conventional scenario, when a request is adjusted, a group of entities may manually perform tasks to handle that adjustment. Each entity can be notified of the alert and may then interact with one of the computer subsystems to perform a related task. This is a slow process that can be error prone. It can also consume a significant amount of computing resources, because entities may perform duplicative tasks on different computer subsystems. Some examples can overcome these problems by providing a batch-adjustment notification network that can automatically determine which subsystems to notify of an alert, determine how to notify those subsystems (e.g., in terms of the formatting for appropriate notifications and the order of the notifications), and then automatically notify those subsystems. This automated technique can improve processing speeds and productivity with respect to handling adjusted requests, as well as reduce errors in the handling of said requests.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of an subsystem-specific notification environment 100 for providing notifications of adjustments to submitted batched requests according to some aspects of the present disclosure. The subsystem-specific notification environment 100 can include a batch processing framework 102, a batch-adjustment notification framework 130, and a plurality of subsystems 104. The batch-adjustment notification framework 130 can include a queue handler 132, a database 138, and a plurality of message queues 106. The batch processing framework 102 and each subsystem of the plurality of subsystems 104 can communicate with the batch-adjustment notification framework 130 over one or more communication networks. The one or more communication networks may correspond to one or more Wide Area Networks ("WANs"), such as the Internet, through which the batch-adjustment notification framework 130, the batch processing framework 102, and each subsystem of the plurality of subsystems 104 may communicate with servers via web browsers or client-side applications, to establish communication sessions, request and receive web-based resources, and access other features of applications or services.

The plurality of message queues 106 can include queue 106a, queue 106b, queue 106c, and queue 106d. Although four message queues are depicted in FIG. 1, the plurality of message queues 106 can include any number of message queues, including one message queue. The plurality of subsystems 104 can include subsystem 104a, subsystem 104b, subsystem 104c, subsystem 104d, and subsystem 104e. Although five subsystems are depicted in FIG. 1, the plurality of subsystems 104 can include any number of subsystems, including one subsystem.

Each subsystem in the plurality of subsystems 104 can be configured to receive notifications from a corresponding message queue in the plurality of message queues 106. The notifications can be subsystem-specific notifications of an occurrence of an event involving an adjustment to a previously submitted batch of requests. The subsystem-specific notifications can be formatted according to certain formatting criteria for each subsystem in the plurality of subsystems 104. The formatting criteria for a given subsystem may require that its corresponding notifications include certain code, amounts of data, types of data, commands, syntaxes, or some combination thereof.

Each subsystem can may have one or more corresponding message queues. In some examples, multiple subsystems can share a single corresponding message queue when the multiple subsystems have similar formatting criteria. A single subsystem can have multiple corresponding message queues if, for example, a formatting criterion for the single subsystem is relaxed compared to formatting criteria of other subsystems in the plurality of subsystems 104. In FIG. 1, queue 106a is depicted as a corresponding message queue for subsystem 104a, queue 106b is depicted as a corresponding message queue for subsystem 104b, queue 106c is depicted as a corresponding message queue for subsystem 104c and queue 106d is depicted as a corresponding message queue for both subsystem 104d and subsystem 104e.

The batch processing framework 102 can receive batch requests, process the batch requests, perform adjustments to the batch requests, and send alerts associated with the adjustments. The queue handler 132 of the batch-adjustment notification framework 130 can receive an alert from the batch processing framework 102. The alert can indicate an occurrence of an event involving an adjustment to a previously submitted batch of requests. The queue handler 132 can identify a set of subsystems from the plurality of subsystems 104 to perform tasks associated with the adjustment. When identifying the set of subsystems, the queue handler 132 can use the database 138. The database 138 can contain subsystem data describing each subsystem in the plurality of subsystems 104. The subsystem data can include tasks that each subsystem can perform. In identifying the set of subsystems, the queue handler 132 can compare tasks associated with the adjustment to the tasks that each subsystem can perform. When tasks that a particular subsystem can perform match at least one of the tasks associated with the adjustment, the particular subsystem can be identified by the queue handler 132 as one subsystem in the set of subsystems. The set of subsystems can include any number of subsystems, ranging from zero subsystems to a total number of subsystems included in the plurality of subsystems 104.

For each subsystem in the set of subsystems, the queue handler can customize, based on formatting criteria associated with the subsystem, a subsystem-specific notification of the event. When customizing subsystem-specific notifications, the queue handler 132 can use the database 138. The database 138 can contain subsystem data describing each subsystem in the plurality of subsystems 104. The subsystem data can include details about formatting criteria for each subsystem.

The queue handler 132 can publish each subsystem-specific notification to one of the message queues in the plurality of message queues 106 for transmission to a corresponding subsystem. Once the subsystem-specific notification is received by the corresponding subsystem, the corresponding subsystem can automatically perform a task related to the adjustment. Examples of the task can include notifying a user of the adjustment, updating an amount of a value in a recurring requests database, updating user or third-party account information in a recurring requests database, updating information in an accounts database, or some combination thereof.

In an example depicted in FIG. 1, the queue handler 132 receives an alert (depicted in FIG. 1 as a batch adjustment alert) of an occurrence of an event involving an adjustment from the batch processing framework 102. In the example, the queue handler 132 identifies two subsystems of the plurality of subsystems 104 to perform tasks related to the adjustment. The two identified subsystems include subsystem 104a and subsystem 104c as depicted in FIG. 1. The queue handler 132 customizes two subsystem-specific notifications: a first notification 108 and a second notification 110 as depicted in FIG. 1). The queue handler 132 publishes the first notification 108 to queue 106a and the second notification 110 to queue 106c. The queue handler 132 can publish the first notification 108 and the second notification 110 simultaneously. In some examples, there can be a delay between publishing the first notification 108 and the second notification 110. Queue 106a transmits the first notification 108 to subsystem 104a and subsystem 104a automatically performs at least one task related to the adjustment. Queue 106c transmits the second notification 110 to subsystem 104c and subsystem 104c automatically performs at least one task related to the adjustment.

Figure 2:
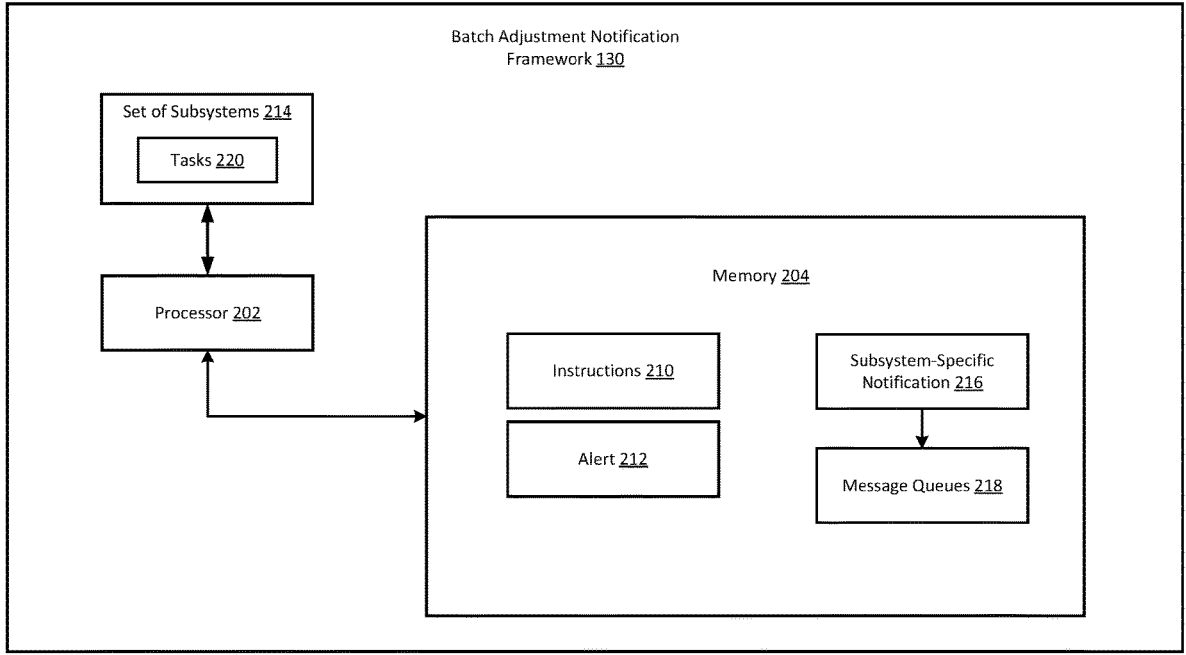
FIG. 2 is a block diagram of an example of a batch-adjustment notification framework according to some aspects of the present disclosure.

FIG. 2 is a block diagram of an example of a batch-adjustment notification framework 130 according to some aspects of the present disclosure. As shown, the batch-adjustment notification framework 130 includes the processor 202 communicatively coupled to the memory 204. The processor 202 can include one processing device or multiple processing devices. Non-limiting examples of the processor 202 include a Field-Programmable Gate Array (FPGA), an application specific integrated circuit (ASIC), a microprocessor, or any combination of these. The processor 202 can execute instructions 210 stored in the memory 204 to perform operations. In some examples, the instructions 210 can include processor-specific instructions generated by a compiler or an interpreter from code written in any suitable computer-programming language, such as C, C++, C#, Python, or Java.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 210. The non-transitory computer-readable medium can include electronic, optical, magnetic, or other storage devices capable of providing the processor 202 with the instructions 210 or other program code. Non-limiting examples of the non-transitory computer-readable medium include magnetic disk(s), memory chip(s), RAM, an ASIC, or any other medium from which a computer processor can read instructions 210.

The memory 204 can further include an alert 212, a subsystem-specific notification 216, and message queues 218. The batch-adjustment notification framework 130 can receive the alert 212 from a batch processing framework 102. The alert 212 can indicate an occurrence of an event involving an adjustment. The batch-adjustment notification framework 130 can identify a set of subsystems 214 from a plurality of subsystems 104 to perform tasks 220 associated with the adjustment. The batch-adjustment notification framework 130 can identify the set of subsystems 214 based on the tasks 220 that the set of subsystems 214 can automatically perform. Each subsystem in the set of subsystems 214 can correspond to at least one message queue in the message queues 218.

For each corresponding subsystem in the set of subsystems 214, the batch-adjustment notification framework 130 can customize the subsystem-specific notification 216. The subsystem-specific notification 216 can be formatted according to certain formatting criteria for the corresponding subsystem. The batch-adjustment notification framework 130 can publish the subsystem-specific notification 216 to at least one message queue of the message queues 218. The at least one message queue of the message queues 218 can transmit the subsystem-specific notification 216 to the corresponding subsystem. The corresponding subsystem can, upon receiving the subsystem-specific notification 216 automatically perform at least one task related to the adjustment.

In some examples, the batch-adjustment notification framework 130 can implement the process 300 shown in FIG. 3. Other examples can involve more operations, fewer operations, different operations, or a different order of the operations shown in FIG. 3. The operations of FIG. 3 will now be described below with reference to the components described above. Some or all of the steps can be performed by the processor 202.

At block 310, the process 300 involves receiving an alert 212 indicating an occurrence of an event involving an adjustment to a previously submitted batch of requests. The alert 212 can be received from a batch receiver. The adjustment can be a change associated with a request, a return of a request, or a cancellation of at least one request due to an issue. Examples of the issue can include an outage of a server associated with either the batch receiver or the one or more processors, or server downtime for maintenance. Tasks that can be automatically performed by subsystems in response to an issue can include updating databases, providing notifications, or resubmitting the request as part of a new batch of requests.

When the adjustment is a change to the content in a field of the request, the request can be resolved, but at least one subsystem may receive a notice of the change and perform tasks to update databases. These updates may be leveraged in the future to avoid complications with future batch requests. For example, the request associated with the adjustment can be a recurring request. The subsystem can update data in a recurring request database. Then when associated future requests are processed a batch processing framework, the change to the content in a field of the associated future requests can be avoided. When the adjustment is a request or a cancellation, the request may not be resolved, and a user may be notified of the adjustment by a subsystem. Once notified, the user can make new plans regarding the request.

At block 320, the process 300 involves identifying a set of subsystems 214 from a plurality of subsystems 104 to notify of the occurrence of the event. Each subsystem in the set of subsystems is configured to receive notifications from a corresponding message queue of a plurality of message queues. Subsystems in the set of subsystems 214 can perform tasks related to the adjustment. For example, the adjustment can be a return and a particular subsystem in the set of subsystems 214 can be identified because the particular subsystem can be capable of notifying a user of the return, provided that the particular subsystem receives a subsystem-specific notification 216 of the return.

At block 330, the process 300 involves, for each message queue of the plurality of message queues, customizing a subsystem-specific notification 216 of the occurrence of the event. The subsystem-specific notification 216 being formatted according to certain formatting criteria for a corresponding subsystem. The formatting criteria can be requirements of the corresponding subsystem to accept or understand the subsystem-specific notification 216. The subsystem-specific notification 216 may have to be formatted in accordance with the formatting criteria to be compatible with the corresponding subsystem. The formatting criteria may require that certain code, commands, syntaxes, fields, content, etc., be used in the subsystem-specific notification 216.

Customizing the subsystem-specific notification 216 can involve reformatting data associated with the alert. Customizing the subsystem-specific notification 216 can also including enriching data by adding additional information to the data. For instance, the batch-adjustment notification framework 130 can anticipate prerequisite data associated with particular tasks associated with the adjustment that a subsystem can perform. The prerequisite data can include biographical information for a user or a third-party account. The batch notification framework can access a database, retrieve the prerequisite data, and add the prerequisite data to the subsystem-specific notification 216.

In some examples, a message queue can have multiple corresponding subsystems. For instance, the multiple corresponding subsystems can include similar formatting criteria and a single subsystem-specific notification 216 can be customized for all corresponding subsystems in the multiple corresponding subsystems.

At block 340, the process 300 involves, for each message queue of the plurality of message queues, publishing the subsystem-specific notification 216 to the message queue for transmission to the corresponding subsystem. Upon receiving the subsystem-specific notification 216, the corresponding subsystem can automatically perform at least one task. The at least one task can be related to the adjustment. Examples of the at least one task can include notifying a user of the adjustment, updating an amount of a value in a recurring requests database, updating user or third-party account information in a recurring requests database, updating information in an accounts database, or some combination thereof.

In some examples, publishing the subsystem-specific notification 216 can involve publishing the subsystem-specific notification 216 to each message queue in a sequential order. The sequential order can be determined based on a predefined priority associated with the set of subsystems. The predefined priority may be assigned by a system administrator or another user, designated in a configuration file, etc. The predefined priority can be based on tasks performed by the subsystems. In some examples, a subsystem may not be able to perform a task until after a different subsystem has performed a task associated with an adjustment. For example, when the adjustment is a return, a task of notifying a user of the return can have higher priority than a task of updating an account database to include information regarding the return. Thus, the batch-adjustment notification framework 130 can publish the subsystem-specific notification 216 associated with a first subsystem that will notify the user prior to publishing the subsystem specific notification associated with a second subsystem that will perform the account database update. Additionally, the predefined priority can be based on a type of adjustment. For example, tasks associated with returns can have higher priority than tasks associated with notices of change.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method for handling adjustments to batch requests, the method comprising:

receiving, by a queue handler of a batch-adjustment notification framework, an alert from a batch processing framework indicating an adjustment to at least one request within a previously submitted batch of requests, wherein the adjustment is applied to the at least one request by the batch processing framework in response to identifying a problem with the at least one request while processing the at least one request, and wherein the adjustment is configured to address the problem with the at least one request;

identifying, by the queue handler, a set of subsystems from a plurality of subsystems to notify of the adjustment, wherein each subsystem in the set of subsystems is configured to receive notifications from a corresponding message queue of a plurality of message queues, wherein the set of subsystems is different from the batch processing framework, and wherein the identifying includes the queue handler comparing tasks associated with the adjustment to tasks that each subsystem can perform; and for each message queue of the plurality of message queues:

customizing, by the queue handler, a subsystem-specific notification of the adjustment, the subsystem-specific notification being formatted according to a formatting criteria for a corresponding subsystem;

publishing, the subsystem-specific notification to the message queue for transmission to the corresponding subsystem; and transmitting the subsystem-specification notification from the message queue to the corresponding subsystem, wherein a subsystem of the set of subsystems is configured to receive a corresponding system-specific notification from a message queue of the plurality of message queues and responsively execute a task configured to prevent recurrence of the problem in relation to the at least one request or another future request.

2. The method of claim 1, wherein the adjustment comprises a cancellation of the at least one request in the previously submitted batch of requests.

3. The method of claim 1, wherein identifying the set of subsystems comprises identifying the set of subsystems based on the adjustment.

4. The method of claim 1, wherein each subsystem of the set of subsystems is configured to automatically perform at least one task in response to receiving the subsystem-specific notification about the adjustment from its corresponding message queue, wherein the at least one task is configured to avoid the recurrence of the problem in relation to the at least one request or one or more future requests.

5. The method of claim 1, further comprising:

publishing each subsystem-specific notification to each message queue in a sequential order, the sequential order being determined based on a predefined priority associated with the set of subsystems.

6. The method of claim 1, further comprising customizing at least one subsystem-specific notification for at least one message queue corresponding to at least one subsystem of the set of subsystems by:

retrieving additional data associated with the adjustment; and adding the additional data to the at least one subsystem-specific notification.

7. The method of claim 1, wherein at least one subsystem in the set of subsystems is external to a network associated with a notification framework.

8. A system for handling adjustments to batch requests, the system comprising:

one or more processing devices; and a memory that includes instructions executable by the one or more processing devices to perform operations comprising:

receiving, by a queue handler of a batch-adjustment notification framework, an alert from a batch processing framework indicating an adjustment to at least one request within a previously submitted batch of requests, wherein the adjustment is applied to the at least one request by the batch processing framework in response to identifying a problem with the at least one request while processing the at least one request, and wherein the adjustment is configured to address the problem with the at least one request;

identifying, by the queue handler, a set of subsystems from a plurality of subsystems to notify of the adjustment, wherein each subsystem in the set of subsystems is configured to receive notifications from a corresponding message queue of a plurality of message queues, wherein the set of subsystems is different from the batch processing framework, and wherein the identifying includes the queue handler comparing tasks associated with the adjustment to tasks that each subsystem can perform; and for each message queue of the plurality of message queues:

customizing, by the one or more processors queue handler, a subsystem-specific notification of the adjustment, the subsystem-specific notification being formatted according to a formatting criteria for a corresponding subsystem;

publishing, by the one or more processors, the subsystem-specific notification to the message queue for transmission to the corresponding subsystem; and transmitting the subsystem-specification notification from the message queue to the corresponding subsystem, wherein a subsystem of the set of subsystems is configured to receive a corresponding system-specific notification from a message queue of the plurality of message queues and responsively execute a task configured to prevent recurrence of the problem in relation to the at least one request or another future request.

9. The system of claim 8, wherein the adjustment comprises a return of the at least one request in the previously submitted batch of requests.

10. The system of claim 8, wherein the operation of identifying the set of subsystems comprises identifying the set of subsystems based on the adjustment.

11. The system of claim 8, wherein each subsystem of the set of subsystems is configured to automatically perform at least one task in response to receiving the subsystem-specific notification about the adjustment from its corresponding message queue.

12. The system of claim 8, the operations further comprising:

publishing each subsystem-specific notification to each message queue in a sequential order, the sequential order being determined based on a predefined priority associated with the set of subsystems.

13. The system of claim 8, the operations further comprising customizing at least one subsystem-specific notification for at least one message queue corresponding to at least one subsystem of the set of subsystems by:

retrieving additional data associated with the adjustment; and adding the additional data to the at least one subsystem-specific notification.

14. A non-transitory computer-readable medium comprising instructions that are executable by one or more processing devices for causing the one or more processing devices to perform operations of handling adjustments to batch requests, the operations comprising:

receiving, by a queue handler of a batch-adjustment notification framework, an alert from a batch processing framework indicating an adjustment to at least one request within a previously submitted batch of requests, wherein prior to the operation of receiving the alert, the batch processing framework is configured to:

apply the adjustment to the at least one request as a result of identifying a problem with the at least one request while processing the at least one request, wherein the adjustment is configured to address the problem with the at least one request; and based on applying the adjustment to the at least one request, transmit the alert indicating the adjustment;

identifying, by the queue handler, a set of subsystems from a plurality of subsystems to notify of the adjustment, wherein each subsystem in the set of subsystems is configured to receive notifications from a corresponding message queue of a plurality of message queues, wherein the set of subsystems is different from the batch processing framework, and wherein the identifying includes the queue handler comparing tasks associated with the adjustment to tasks that each subsystem can perform;

for each message queue of the plurality of message queues:

customizing, by the one or more processors queue handler, a subsystem-specific notification of the adjustment, the subsystem-specific notification being formatted according to a formatting criteria for a corresponding subsystem;

publishing, by the one or more processors, the subsystem-specific notification to the message queue for transmission to the corresponding subsystem; and transmitting the subsystem-specification notification from the message queue to the corresponding subsystem, wherein a subsystem of the set of subsystems is configured to receive a corresponding system-specific notification from a message queue of the plurality of message queues and responsively execute a task configured to prevent recurrence of the problem in relation to the at least one request or another future request.

15. The non-transitory computer-readable medium of claim 14, wherein the adjustment comprises a change to a value of the at least one request in the previously submitted batch of requests.

16. The non-transitory computer-readable medium of claim 14, wherein the set of subsystems is identified based on the adjustment at least in part by: accessing a database that correlates subsystems to tasks executable by the subsystems;

identifying a set of tasks, in the database, associated with the adjustment;

determining that the set of subsystems are correlated, in the database, to the set of tasks; and based on determining that the set of subsystems are correlated in the database to the set of tasks, selecting the set of subsystems from the database to notify of the adjustment.

17. The non-transitory computer-readable medium of claim 14, wherein each subsystem of the set of subsystems is configured to automatically select at least one task based on the problem and perform the at least one task in response to receiving the subsystem-specific notification about the adjustment from its corresponding message queue.

18. The non-transitory computer-readable medium of claim 14, wherein:

the alert indicating the adjustment is received from the batch processing framework only after expiration of a predetermined grace period following submission of the batch of requests;

the adjustment comprises a return of the at least one request due to an account associated with the at least one request being inactive;

customizing the subsystem-specific notification for the corresponding subsystem involves adding additional data not present in the alert to the subsystem-specific notification, the additional data including at least one of a phone number or an Internet Protocol (IP) address associated with the at least one request; and the corresponding subsystem is configured to use the additional data to perform an authentication check before updating a database based on the returned request.

19. The non-transitory computer-readable medium of claim 14, wherein the at least one request is an automatically recurring request, and wherein the task executed by the subsystem includes modifying a parameter of the automatically recurring request to prevent a future submission of the automatically recurring request from triggering the problem.

20. The non-transitory computer-readable medium of claim 14, wherein the task executed by the subsystem includes modifying and resubmitting the at least one request as part of a new batch of requests to the batch processing framework.

* * * * *